E. J. CADY.
MICROMETER CALIPER.
APPLICATION FILED MAY 31, 1918.
1,300,210.
Patented Apr. 8, 1919.
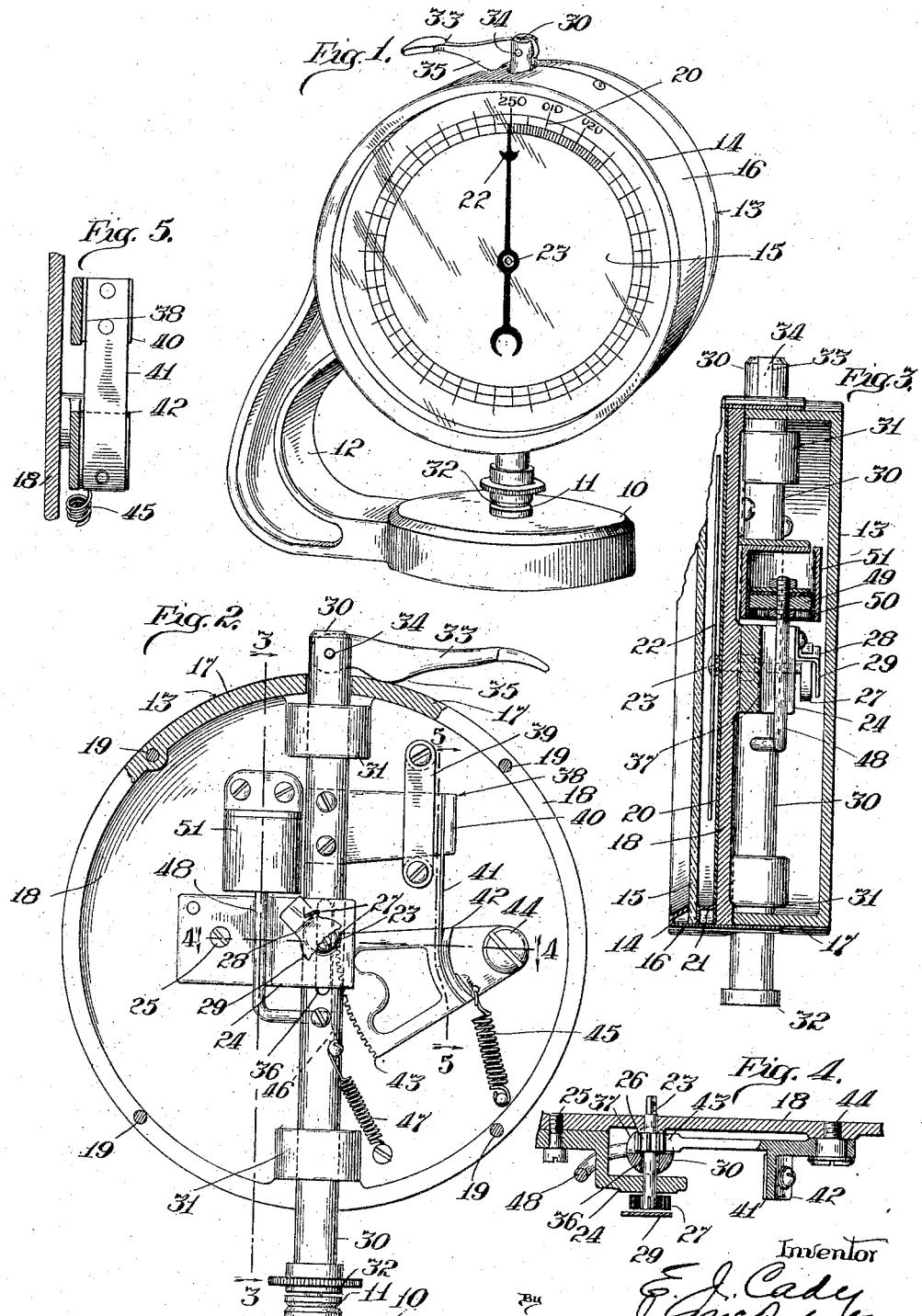

UNITED STATES PATENT OFFICE.

ELISHA JESSE CADY, OF OAK PARK, ILLINOIS.

MICROMETER-CALIPER.

1,300,210.　　　　　Specification of Letters Patent.　　Patented Apr. 8, 1919.

Application filed May 31, 1918. Serial No. 237,457.

*To all whom it may concern:*

Be it known that I, ELISHA JESSE CADY, a citizen of the United States, residing at Oak Park, in the county of Cook and State of Illinois, have invented certain new and useful Improvements in Micrometer-Calipers, of which the following is a specification, reference being had therein to the accompanying drawing.

My invention relates to micrometer calipers for measuring the thicknesses of various materials, and especially to such instruments for measuring the thicknesses of different grades or "points" of paper-stock in which the material is graded in variations of one-thousandth part of an inch.

The invention consists in the matters hereinafter described and then pointed out in the appended claims, and its features are illustrated in the accompanying drawing in which, Figure 1 is a view in front elevation of the device partly in perspective showing the general arrangement of the visible parts;

Fig. 2 is view in rear elevation of the back of the supporting plate with its associated elements, parts being broken away;

Fig. 3 is a vertical transverse sectional view on the line 3—3 of Fig. 2;

Fig. 4 is a detail sectional view on the line 4—4 of Fig. 2, and

Fig. 5 is a detail vertical sectional view on the line 5—5 of Fig. 2.

In the drawings the reference numeral 10 represents the usual base having a central flat anvil 11 and supporting a curved bracket-arm 12 which carries at its upper free end the usual circular casing 13 spaced a suitable distance above the base and carrying a removable front closing-cap 14 comprising a glass face 15 and a rear flange 16 fastened to the front flange 17 of the casing to provide a central chamber. A circular supporting-plate 18 is secured by lag screws at 19 to the flange 17, and the usual circular dial 20 having an indicating scale on which the gradations or divisions are marked in units of one-thousandth part of an inch from zero to .250 is clamped between the front face of the plate 18 and a spacing band or bead 21 in the cap 14 to leave a space between the glass-front of the cap and the plate 18 for the revoluble pointer 22 which is mounted on the front squared end of a revoluble spindle 23 projecting through an opening at the center of the scale and mounted to freely rotate in bearings in the plate 18 and in an offset bracket 24 secured at 25 on the rear face of the plate. The spindle 23 carries a fixed pinion 26 and its rear end projects through the bracket 24 where it is secured to one end of the usual coil-spring 27 whose other end engages an abutment 28 which is secured to the bracket 24 and carries a circular retaining plate 29 which overlies the rear end of the spindle and the convolutions of the spring thereon, so that when the spindle is rotated to move the pointer away from its normal zero position the spring is put under tension. A plunger 30 is mounted in line with the anvil 11 in suitable bearings 31 on the rear face of the plate 18 to reciprocate up and down, its lower end passing freely through an opening in the lower portion of the flanges 16 and 17 and carrying a flat disk 32 to register with the anvil, and its upper end passing through a similar opening in the upper portions of these flanges and carrying an operating handle or lever 33 which is pivoted at one end on a pin 34 in the top of the plunger and has an intermediate cam face 35 adapted to bear on the outer surface of the flange 17 and raise the plunger when the outer free end of this lever is depressed. The plunger is provided with a central elongated slot 36 to enable it to freely straddle the spindle 23, and with an elongated lateral recess 37 to enable it to clear the pinion 26.

The plunger carries near its top a laterally offset arm 38 which reciprocates in a keeper 39 and is provided at it free end with a rearwardly projecting shoulder 40 to which one end of a flat flexible band 41 is secured, and the other end of this band is secured to the lower portion of a drum-segment 42 which is so disposed that its point of contact with the band winding on it is in its tangential line passing to the operative face of the shoulder 40 so that the upward pull of the band on the drum is at all times direct and uniform. The drum 42 is mounted on a segmental gear wheel 43 which is pivoted to the plate 18 at 44 with its teeth engaging the pinion 26 on the spindle 23, and it is held in its retracted position corresponding to the zero position of the pointer on the dial by the pull of a strong return-spring 45 which is secured at one end to the gear wheel and at its opposite end to the plate 18. The plunger is undercut as shown at 46 to allow the gear wheel 43 to engage the pinion 26 and to freely turn on its pivot. When the lever 33 is depressed it raises the plunger off the anvil and the movement of the plunger is communicated to the gear wheel 43 by the direct pull of the band 41 on the drum, and the gear wheel in turn rotates the spindle 23 to move the pointer. By this arrangement the power to turn the gear wheel is applied directly from the plunger to the wheel by fixed connections, instead of through the medium of intermediate gears as is customary in prior devices of this kind, so that I eliminate the factor of lost motion between the plunger and spindle which was due to the necessary play of the intermeshing teeth of the former intermediate gears and rendered their devices inaccurate. Also, by this arrangement the pull of the plunger on the gear wheel is always direct in the tangential line of the drum so that the movement of the gear wheel and pointer is uniform during all portions of the measuring stroke of the plunger and the strain on the several parts is reduced to a minimum. Unless the disk of the plunger is pressed strongly against the fabric resting on the anvil to be calipered any slight buckling or waving in the fabric has a tendency to hold the plunger up and thereby register by the pointer on the dial a higher or greater thickness than in fact characterizes the stock, and the direct application of the power of the return spring to the plunger overcomes this objection as the full retractive force of the spring is applied through direct connections and so is not dissipated in overcoming the friction and backlash of intermediate gears. Also, the return-spring 45 by this arrangement serves the further function of keeping the band 41 taut. This return spring may be supplemented if desired by a second return-spring 47 secured at one end to the plunger and at its other end to the plate 18.

When the handle is released the tendency of all return springs, especially when they are strong enough to overcome any unevenness in the fabric and hold it flush and flat on the anvil as is necessary to secure accurate measurements, is to force the plunger down upon the fabric with so much force that the pointer is jerked out of its true position and its squared bearings on the spindle become so worn and uneven that it has more or less lost motion on the spindle so that its indications are not correct or uniform, and in order to obviate this defect and prevent sudden jars on the pointer I employ a pneumatic cushion or check which tends to retard the downstroke of the plunger when the lever is released and allow it to come down on the fabric on the anvil without any jar or blow, although the check does not in any degree reduce the calipering effect or force of the plunger. For this purpose I provide the plunger with an offset piston-arm 48 which carries at its upper free end a plunger 49 having an apron-like washer 50 of leather or other suitable material which works in the open end of a pneumatic cylinder 51 fixed on the plate 18. When the plunger is raised the piston rises in its cylinder and expels the air which passes out between the washer and cylinder wall, and when the plunger drops the vacuum in the cylinder is so slowly filled by the retardation of the passage of air into it past the expanding apron-washer of the plunger that the drop of the plunger is effectually cushioned, the top of the cylinder having a suitable vent-hole.

I claim:—

1. In a calipering device, an anvil, a reciprocating plunger, a gear-segment carrying a drum, fixed connections between the drum and plunger in the tangential line of the drum, a scale and revoluble pointer, a shaft carrying the pointer and a fixed pinion in mesh with the gear-segment, a handle to raise the plunger, a return spring for the plunger.

2. In a calipering device, an anvil, a reciprocating plunger carrying a projecting shoulder, a gear-segment carrying a drum-segment in line with the shoulder, a flexible band connecting the drum-segment and shoulder, a scale and revoluble pointer, a shaft carrying the pointer and a fixed pinion in mesh with the gear-segment, a handle to raise the plunger, and a return spring for the plunger.

3. In a calipering device, an anvil, a reciprocating plunger, a gear-segment, connections between the segment and plunger, a scale and revoluble pointer, a shaft carrying the pointer and a fixed pinion in mesh with a gear-segment, a handle to raise the plunger, a return spring for the plunger, and means to cushion the return-stroke of the plunger.

4. In a calipering device, an anvil, a reciprocating plunger, a gear-segment, fixed connections between the segment and plunger, a scale and revoluble pointer, a shaft carrying the pointer and a fixed pinion in mesh with the gear-segment, a handle to raise the plunger, a return spring for the plunger, a piston carried by the plunger, and a pneumatic cylinder to cushion the piston on the return-stroke of the plunger.

In testimony whereof I affix my signature in presence of two witnesses.

ELISHA JESSE CADY.

Witnesses:
JOHN JOHNSON,
J. McROBERTS.